(12) United States Patent
Shelor et al.

(10) Patent No.: US 6,250,080 B1
(45) Date of Patent: Jun. 26, 2001

(54) MOBILE MODULAR INTERMODAL COGENERATION SYSTEM

(75) Inventors: F. Mack Shelor, Annapolis; Jeffrey Cerquetti, Baltimore; Dennis Finn, Annapolis; Zhen Han, Silver Spring, all of MD (US)

(73) Assignee: Wartsila NSD North America, Inc., Annapolis, MD (US)

( * ) Notice: Subject to any disclaimer, the term of this patent is extended or adjusted under 35 U.S.C. 154(b) by 0 days.

(21) Appl. No.: 09/339,201

(22) Filed: Jun. 24, 1999

(51) Int. Cl.[7] .................................................. F01K 23/10
(52) U.S. Cl. .................................. 60/618; 60/698
(58) Field of Search ............................. 60/618, 648, 698, 60/39.18; 62/238.1

(56) References Cited

U.S. PATENT DOCUMENTS

| | | | |
|---|---|---|---|
| 4,571,949 | * | 2/1986 | Moke ................................ 60/648 X |
| 4,576,005 | * | 3/1986 | Force ................................ 60/648 X |
| 4,899,544 | | 2/1990 | Boyd . |
| 5,001,902 | * | 3/1991 | Garbo ..................................... 60/648 |
| 5,517,822 | | 5/1996 | Haws et al. . |
| 5,626,103 | | 5/1997 | Haws et al. . |

* cited by examiner

*Primary Examiner*—Hoang Nguyen
(74) *Attorney, Agent, or Firm*—Venable; James R. Burdett

(57) ABSTRACT

A mobile cogeneration system fitted into modular intermodal transportation units for ease of transportation, relocation, configuration and reconfiguration, as well as providing an operating environment for the cogeneration system.

20 Claims, 17 Drawing Sheets

MOBILE MODULAR INTERMODAL COGENERATION SYSTEM

BACKGROUND OF THE INVENTION

1. Field of the Invention

The present invention relates to mobile intermodal cogeneration systems. The present invention also relates to the modular transportation structure for the mobile cogeneration system components 2. Statement of the Prior Art The energy business is undergoing major changes. No longer is the large, centralized power plant with widespread transmission systems the obvious choice for power generation. Small, modular, intermodal decentralized cogeneration plants are one of the energy solutions for tomorrow. It makes good economical sense to put the energy production facility exactly where it is needed. Power, heat (hot water), cooling and refrigeration (for use, for example, in the food processing, petrochemical and pharmaceutical industries) can be generated and utilized locally and overall energy losses reduced. This has the added benefit of system flexibility, independence and increased competitiveness.

Cogeneration systems were originated to increase the efficiency of power and heat production as well as for power load management. The capacities of municipal or regional utility systems are sometimes inadequate to meet the demands placed on them particularly during periods of peak load. Base load is the minimum power demand placed on a generation system while peak load is power demand above base load. Other reasons may also exist for the inability to meet consumer load demands, including but not limited to maintenance, breakdowns, natural disasters, etc. In such cases it may become necessary to purchase or generate auxiliary power. Thus, the need exists for a modular mobile intermodal power system that can be easily, quickly, and inexpensively moved to any desired location. This need may be for a supplemental or emergency power system or may, in fact, be able to supply all of the power needs of a small town, a college campus, a hospital, a hotel, an industrial facility, etc.

A cogeneration apparatus comprising a transporting structure and a support frame for transporting the cogeneration apparatus is specially built for the cogeneration apparatus. This includes fabricating the support structure, wheels etc. While this does make the cogeneration apparatus mobile it neither makes it modular nor intermodal.

A carbon dioxide production and cogeneration facility exists where the waste heat recovery unit and carbon dioxide recovery unit are portable and mounted on skids for ease of movement. In other words, the apparatus is palletized and thus moveable. A facility must still be constructed for the apparatus, even if the facility is temporary, and thus, additional costs are incurred.

SUMMARY OF THE INVENTION

SOURCE™ is a small, modular, intermodal natural gas cogeneration system. It can generate from 1–10 MW of power burning most natural gases as well as biogases with extremely low emissions and high efficiency. Its aesthetics and low noise emissions permit the system to be located in the heart of the power load, in the heart of a city, at industrial or field sites, on educational campuses, at shopping malls, in rural or even desolate areas. The mobile modular intermodal cogeneration plant of the present invention generates electric power by driving or powering an engine with gas. The engine releases hot exhaust gasses, which are then captured so that the thermal energy contained in the hot exhaust gasses can be reused. A portion of the output power of the engine can be used to drive or power a boiler to produce hot water. The entire mobile modular intermodal cogeneration plant can be cooled or vented by cooling towers or radiators.

The present invention provides a mobile cogeneration system comprising modular cogeneration components fitted into modular intermodal transportation units. The mobile cogeneration components include single or double engines, alternators, boilers, absorption or centrifugal chillers, electrical units, and single or double cooling towers or radiators. All of the mobile cogeneration system components, except the cooling towers or radiators, are fitted into the modular intermodal transportation units, are shipped in the same modular intermodal transportation unit, and are operated in the same modular intermodal transportation unit. The cooling towers need not be transported in the modular intermodal transportation units and when installed are outside of the remainder of the components because of their inherent functionality. The cooling towers or radiators are, however, mounted on, shipped on and operated on a base frame or support grid comprising the floor, longitudinal support framing members, horizontal support framing members, and flooring supports, beams or joists. The cooling towers or radiators may even be remote from the remainder of the cogeneration system components. The open space units comprise the base frame only. The modular intermodal transportation units are well known in the art. They are the containerized shipping units that can be transported by truck, train, or ship. They can be any color and for purposes of the present invention it may even be beneficial to color code each type of component a different color. Further, the modular intermodal transportation unit becomes the operating environment for the mobile cogeneration system. The electrical modular intermodal transportation unit can be used to house switchgear, for storage, for control operations, for offices, or for maintenance etc. The electrical modular intermodal transportation units could also be fitted with built in office furniture and temperature and humidity insulated. Control operations can include any or all of the operations or maintenance stations and control computers etc. All of the above provides for "plug and play" operation. If a component fails simply unplug it (remove all cables, wires, pipes, etc.) remove it and plug in a new component. Alternatively, simply switch the failed unit out and repair it on site. It is also be possible to have not only standby components but a standby system of the present invention due to the significantly lowered costs of the present invention.

A further object of the invention is the ability to quickly, easily and inexpensively deploy a mobile cogeneration system to any location that can be reached by truck, train or ship. This means that a mobile modular cogeneration system as described herein could be rapidly deployed to areas that have lost power due to natural disasters. Such a mobile modular cogeneration system could be grown or expanded modularly as power needs increased. Thus, configuration and reconfiguration to meet changing needs can be readily accommodated.

Such a mobile modular cogeneration system could be deployed to remote petrochemical field sites, for example. In the event that the power needs decreased or were no longer necessary, the components could be easily, quickly and inexpensively relocated. Thus, most of the investment costs could be recouped because the modular mobile intermodal cogeneration system was not specially designed for a particular site but rather comprises a set of standard "plug and play" components. The modular mobile intermodal cogeneration system of the present invention may even be appropriate for use once a beach head of a battle zone has been secured to provide power for operational or command posts.

The modular mobile intermodal nature of the cogeneration system of the present system also allows for recoupment of financed costs through repossession by a lender in case of default by the purchaser.

A further object of the present invention is to obtain revenues from sales of electrical power to utilities and to reduce costs by means of tax incentives. Current federal legislation in the form of Public Utilities Regulatory Policies Act of 1978 (PURPA) requires the native utility to purchase the excess electrical output of a "qualifying facility," at prices established on the basis of the utility's projected avoided cost. The present system would be able to qualify as a cogeneration facility and, as such, would be entitled to receive this pricing treatment for its sales to the native utility. A qualified cogeneration facility is exempt from many of the State and Federal laws regulating the same public utilities to which they may be interconnected and to which the qualified facility sells excess electrical power. In addition, tax incentives, such as accelerated depreciation, may be available.

DESCRIPTION OF THE INVENTION

Figure 1:
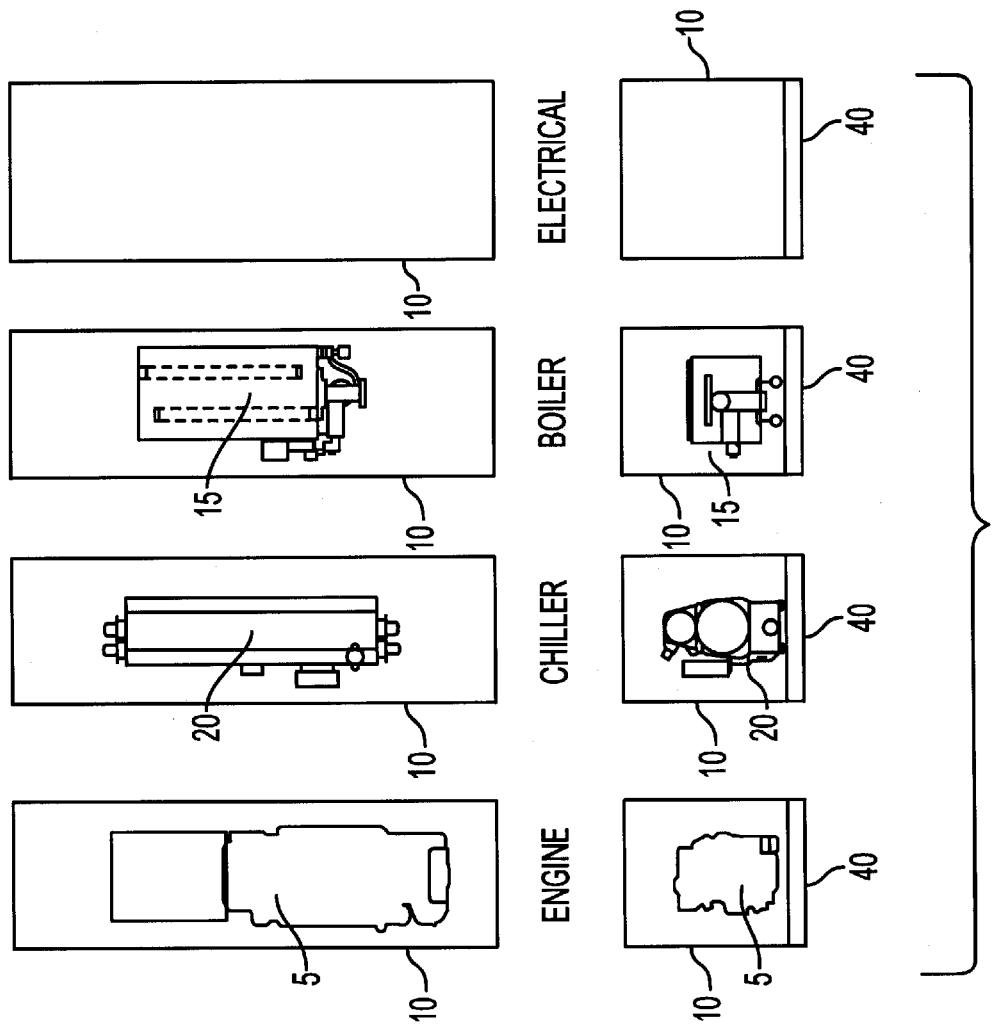
FIG. 1 is a stylized depiction of the top and fronts of the plug and play mobile cogeneration system components that are fitted into modular intermodal transportation units.

Referring to FIG. 1, each engine 5, boiler, 15 and chiller 20 are fitted into a modular intermodal transportation unit 10, which is also electrical unit 10. Modular intermodal transportation unit 10 includes a floor and supporting members 40 for the floor.

Figure 2:
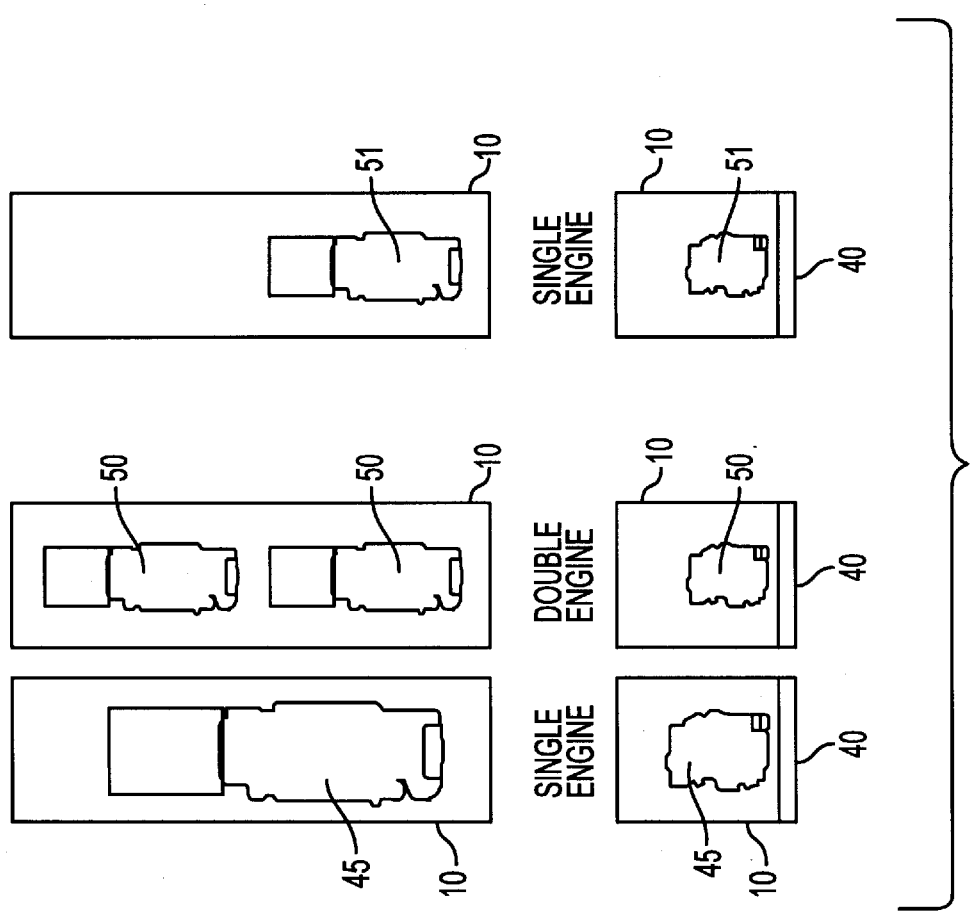
FIG. 2 is a stylized depiction of the top and fronts of the plug and play mobile cogeneration system single and double engine components that are fitted into modular intermodal transportation units.

FIG. 2 shows single engine 45 and a pair of engines 50 (a double engine) each fitted into a modular intermodal transportation unit 10. Modular intermodal transportation unit 10 includes a floor and supporting members 40 for the floor. Engine modules can be either single or double engines and always have an alternator. Examples of engines (single or double) that can be fitted into modular intermodal transportation unit 10 are Cummins QSK19NG and Cummins Wartsila CW180.

Figure 3:
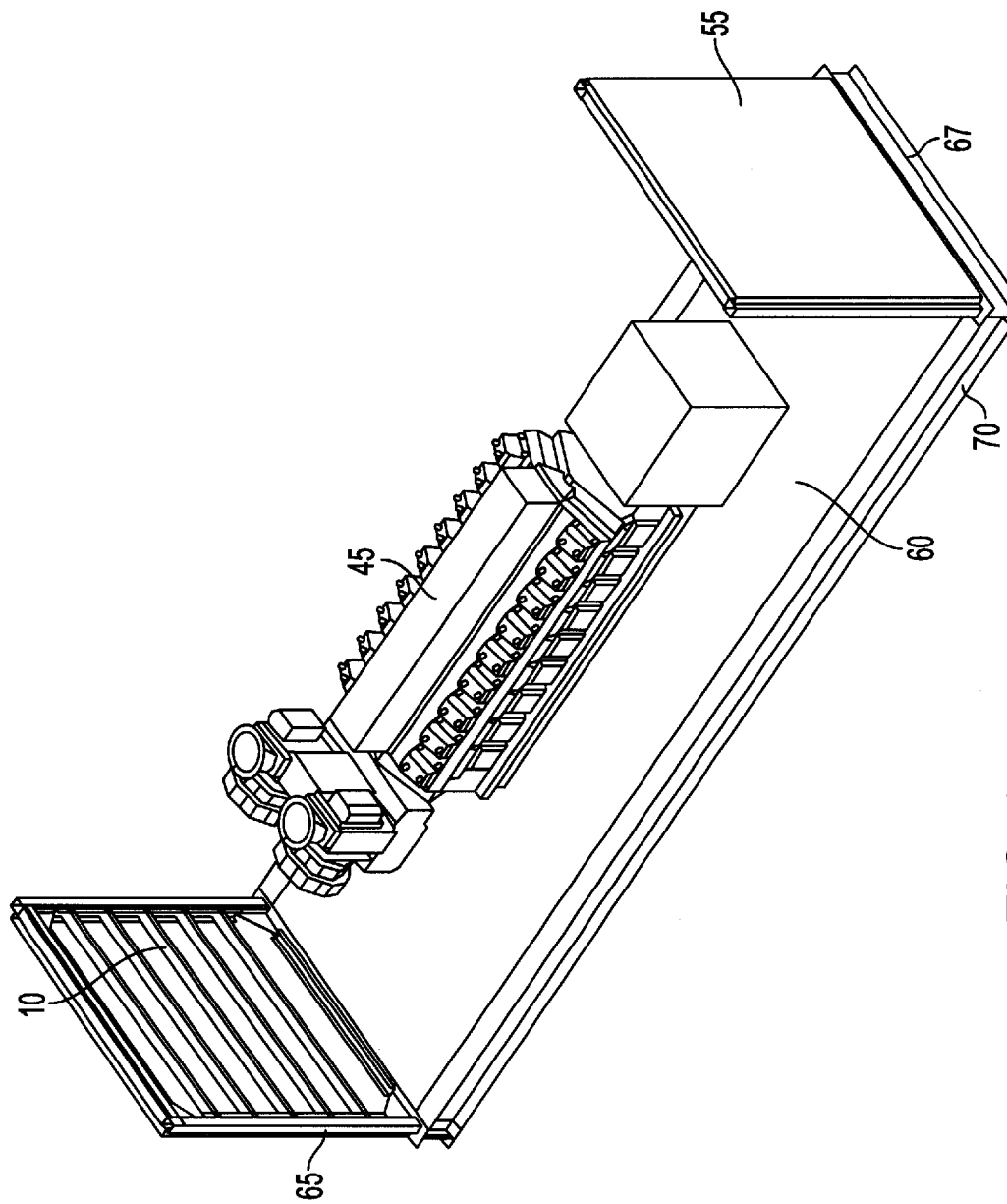
FIG. 3 is a perspective view of a single mobile cogeneration system engine component fitted into a modular intermodal transportation unit.

FIG. 3 is a perspective view of single engine 45 fitted into modular intermodal transportation unit 10. FIG. 3, however, does not show the sides or the top of the modular intermodal transportation unit so that the engine fitted therein can be seen. The nose or front 55 of modular intermodal transportation unit 10 would be transported at the nose of a tractor trailer rig, for example. The rear or tail 65 of modular intermodal transportation unit 10 would be transported at the rear of a tractor trailer rig, for example. Beneath and supporting floor 60 are longitudinal supporting framing members 70 and horizontal supporting framing members 67.

Figure 4:
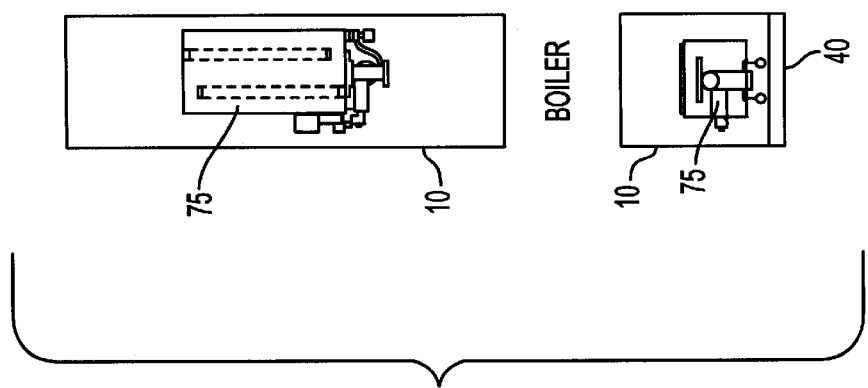
FIG. 4 is a stylized depiction of the top and fronts of the plug and play mobile cogeneration system boiler components that are fitted into modular intermodal transportation units.

FIG. 4 shows boiler 75 fitted into a modular intermodal transportation unit 10. Modular intermodal transportation unit 10 includes a floor and supporting members 40 for the floor.

Figure 5:
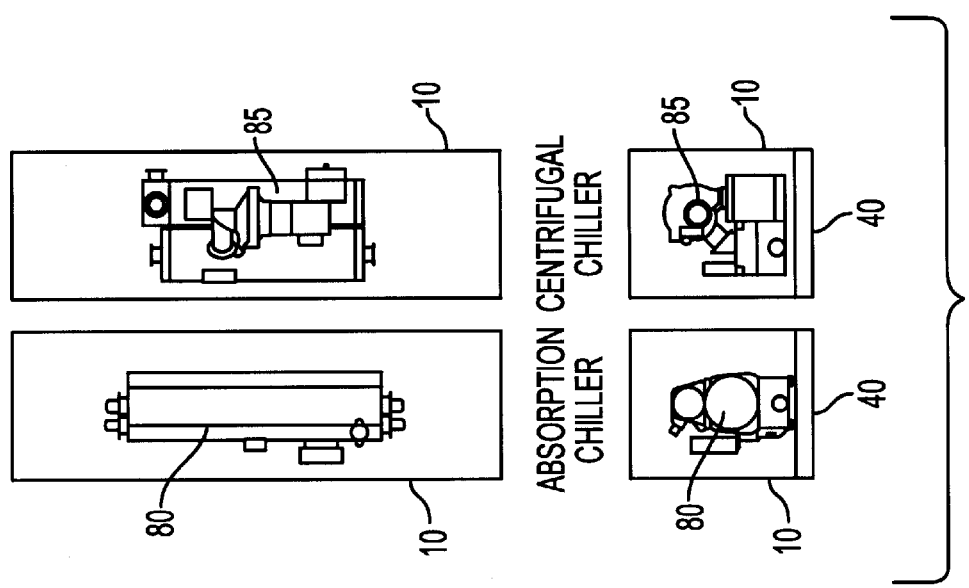
FIG. 5 is a stylized depiction of the top and fronts of the plug and play mobile cogeneration system absorption and centrifugal chiller components that are fitted into modular intermodal transportation units.

FIG. 5 shows absorption chiller 80 and centrifugal chiller 85 each fitted into a modular intermodal transportation unit 10. Modular intermodal transportation unit 10 includes a floor and supporting members 40 for the floor.

Figure 6:
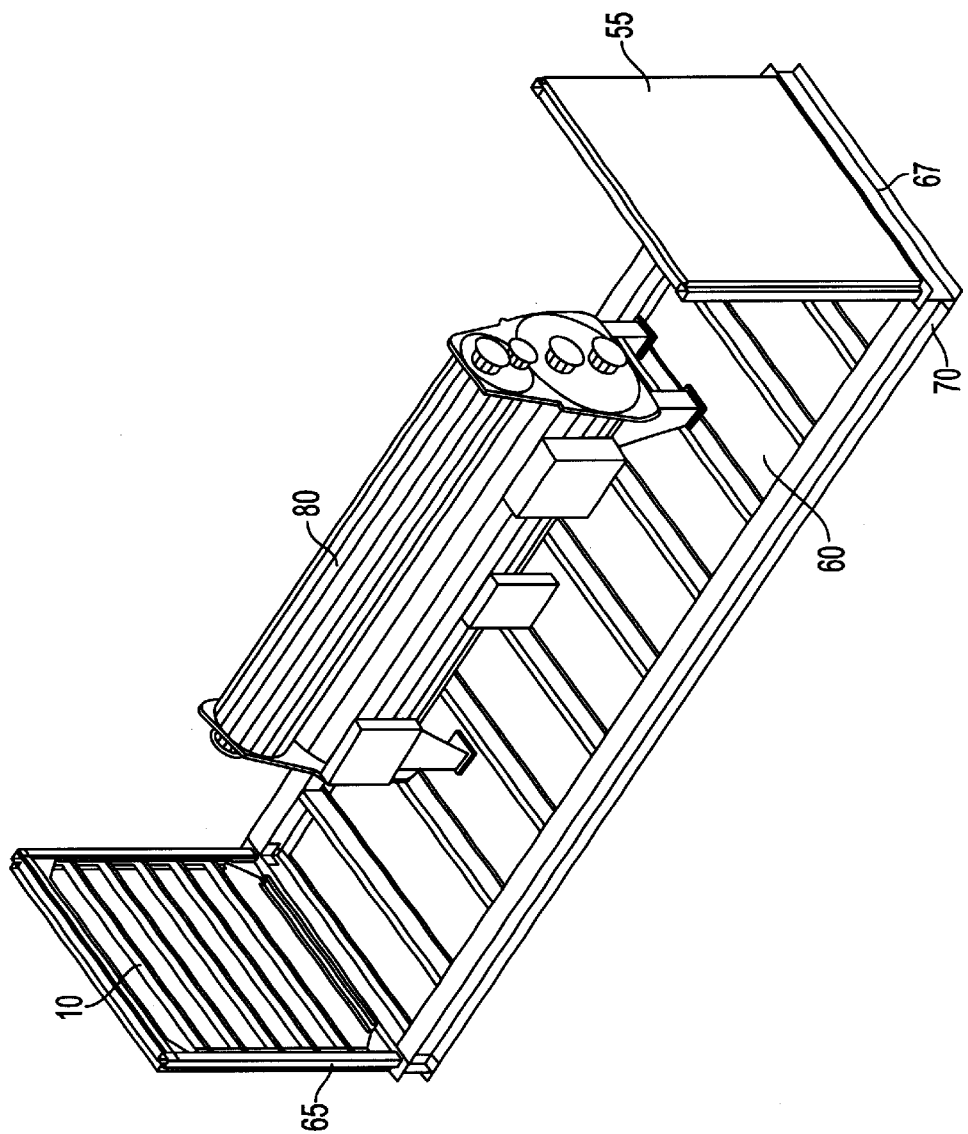
FIG. 6 is a perspective view of a mobile cogeneration system absorption chiller component fitted into a modular intermodal transportation unit.

FIG. 6 is a perspective view of absorption chiller 80 fitted into modular intermodal transportation unit 10. FIG. 6, however, does not show the sides or the top of the modular intermodal transportation unit so that the chiller fitted therein can be seen. The nose or front 55 of modular intermodal transportation unit 10 would be transported at the nose of a tractor trailer rig, for example. The rear or tail 65 of modular intermodal transportation unit 10 would be transported at the rear of a tractor trailer rig, for example. Beneath and supporting floor 60 are longitudinal supporting framing members 70 and horizontal supporting framing members 67.

Figure 7:
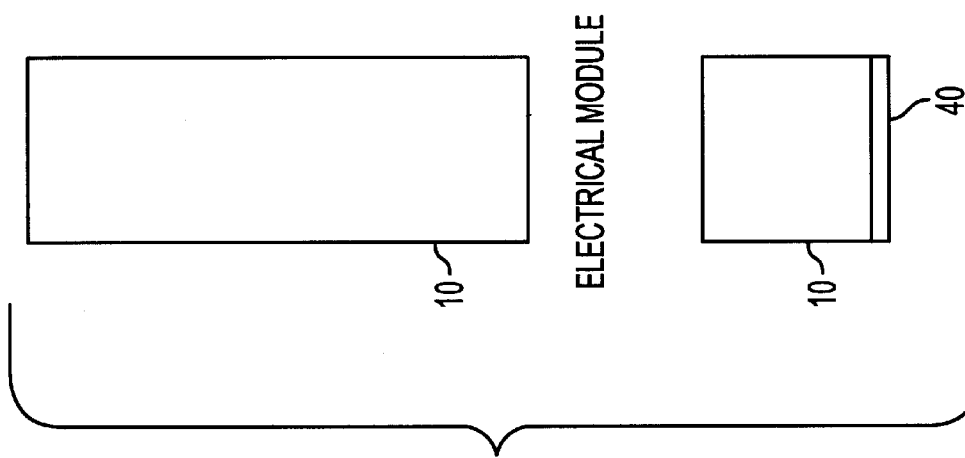
FIG. 7 is a stylized depiction of the top and fronts of the plug and play mobile cogeneration system electrical components.

FIG. 7 shows electrical unit 10, which is identical to a modular intermodal transportation unit 10. Modular intermodal transportation unit 10 includes a floor and supporting members 40 for the floor.

Figure 8:
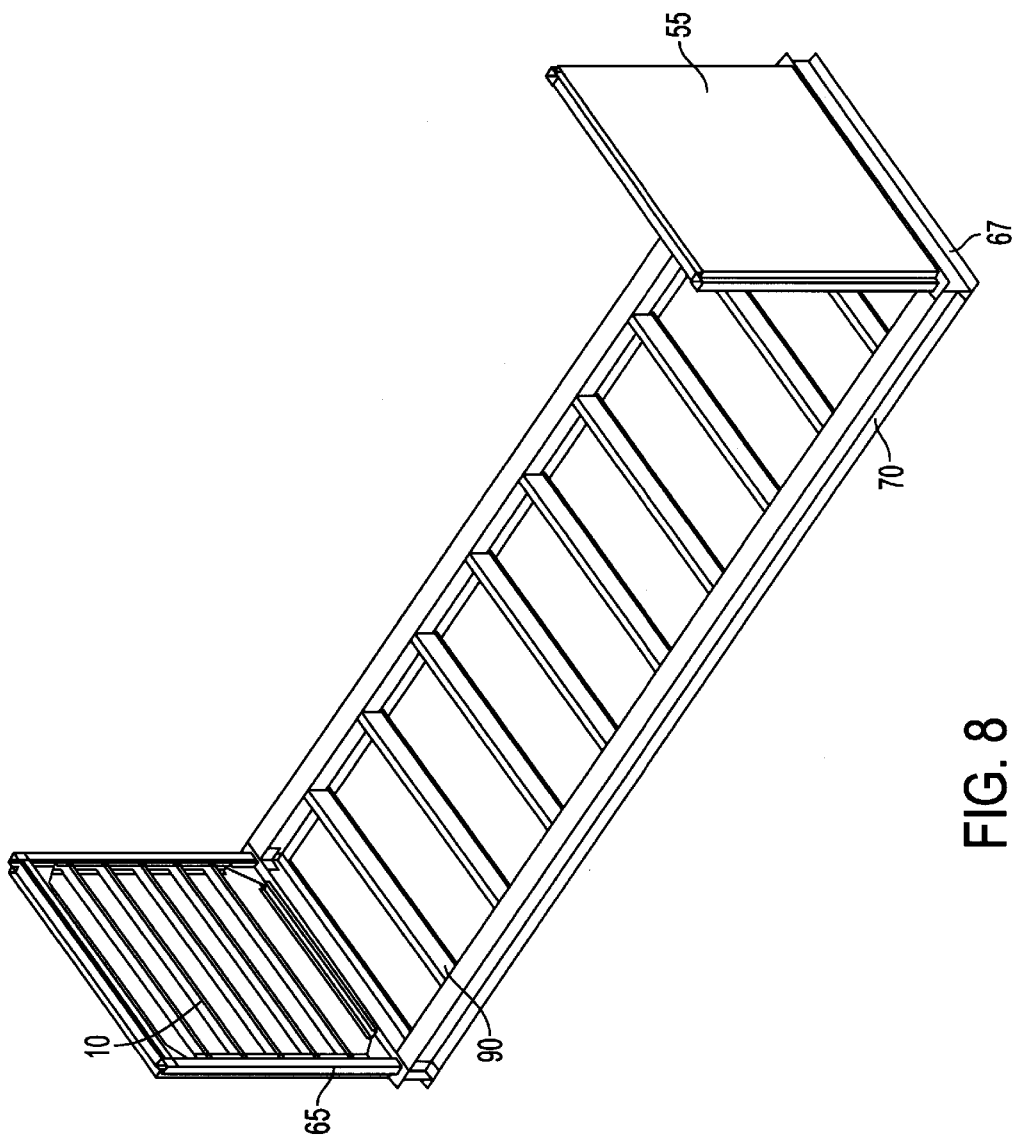
FIG. 8 is a perspective view of a mobile cogeneration system electrical component, which is identical to an empty modular intermodal transportation unit.

FIG. 8 is a perspective view of electrical unit 10 or modular intermodal transportation unit 10. FIG. 8, however, does not show the sides or the top of the modular intermodal transportation unit so that the inside can be seen. The nose or front 55 of modular intermodal transportation unit 10 would be transported at the nose of a tractor trailer rig, for example. The rear or tail 65 of modular intermodal transportation unit 10 would be transported at the rear of a tractor trailer rig, for example. Beneath and supporting the floor (not shown on this figure but shown on FIGS. 3 and 6) are longitudinal supporting framing members 70 and horizontal supporting framing members 67. Flooring supports, beams or joists 90 provide additional support. Each modular intermodal transportation unit 10 is approximately eleven feet high, eight and a half feet wide and forty feet deep (nose to tail) except for the electrical unit (modular intermodal transportation unit), which is ten feet wide.

Figure 9:
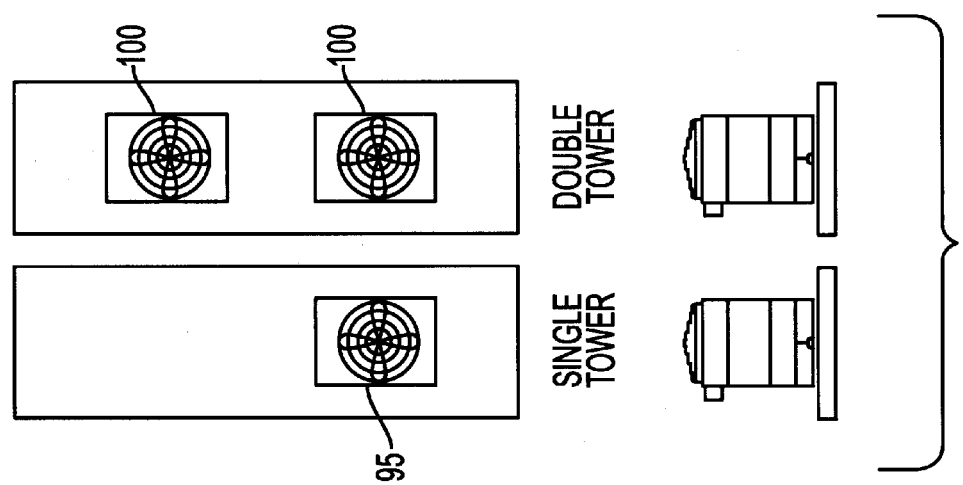
FIG. 9 is a stylized depiction of the top and fronts of the plug and play mobile cogeneration system single and double cooling tower or radiator components.

FIG. 9 shows single cooling tower 95 and a pair of cooling towers 100 (a double cooling tower). The cooling towers can be transported separately. They are not operated within a modular intermodal transportation unit due to their inherent functionality. The cooling towers are always separated from the other cogeneration system components and even separated from each other if necessary for adequate ventilation. While not shown, radiators are treated in the same manner as the cooling towers for purposes of the present invention. Both cooling towers and radiators are mounted on base frames.

Figure 10:
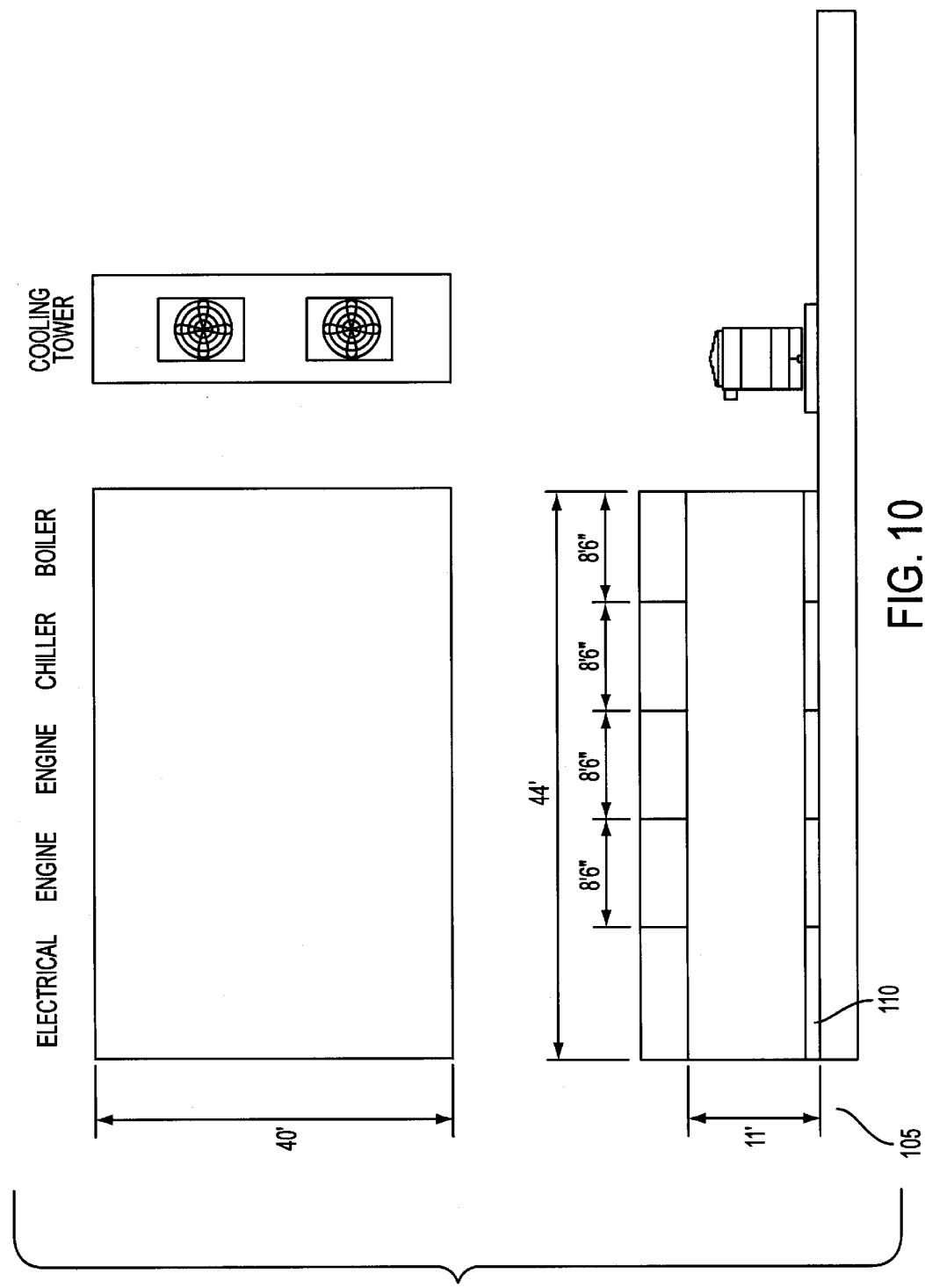
FIG. 10 is a stylized depiction of the top and fronts of en exemplary mobile cogeneration system of the plug and play mobile cogeneration system components that are fitted into modular intermodal transportation units.

FIG. 10 shows exemplary spacing and sizing of the foundation for the "plug and play" components for the mobile modular cogeneration system. Each of the modular intermodal transportation units are approximately forty feet deep (nose to tail) so the foundation must be at least that deep. Further, the approximate height and width of a modular intermodal transportation unit is depicted. The foundation 102, which may be concrete, is supported by the ground 105 and appropriately spaced and sized footers or pilings 110.

Figure 11:
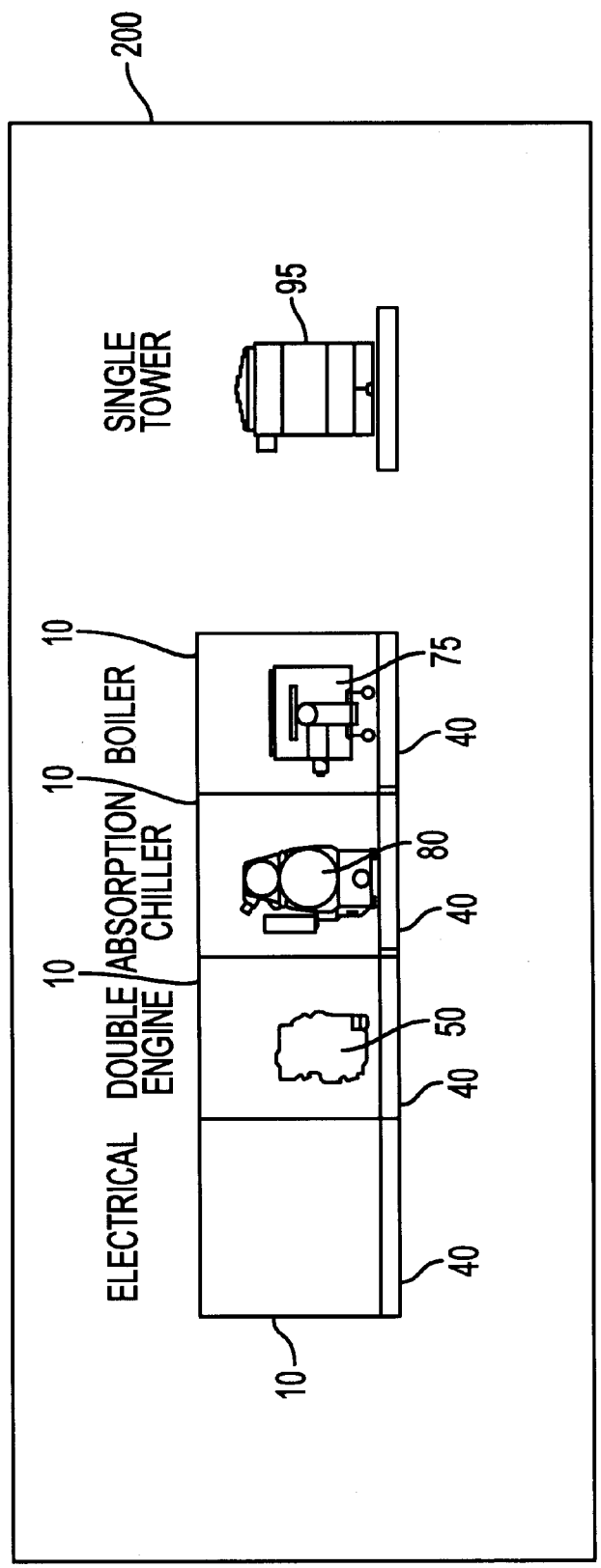
FIG. 11 is a stylized depiction of the front of an exemplary embodiment of a mobile modular intermodal cogeneration system.

FIG. 11 is an exemplary embodiment of a mobile modular intermodal cogeneration system of the present invention. Four modular intermodal transportation units fitted with double engine 50, boiler 75, absorption chiller 80 and a electrical unit 10 are used to produce electrical power, chilled water and hot water. The electrical unit 10 could be used for offices, maintenance, switchgear, control and operations and the like and may even be fitted with built in office furniture. Modular intermodal transportation unit 10 includes a floor and supporting members 40 for the floor. The cooling towers 95 could be replaced by radiators for purposes of the present invention. The foundation of this example mobile modular intermodal cogeneration system would be approximately forty feet deep and thirty-five and a half feet wide.

Figure 12:
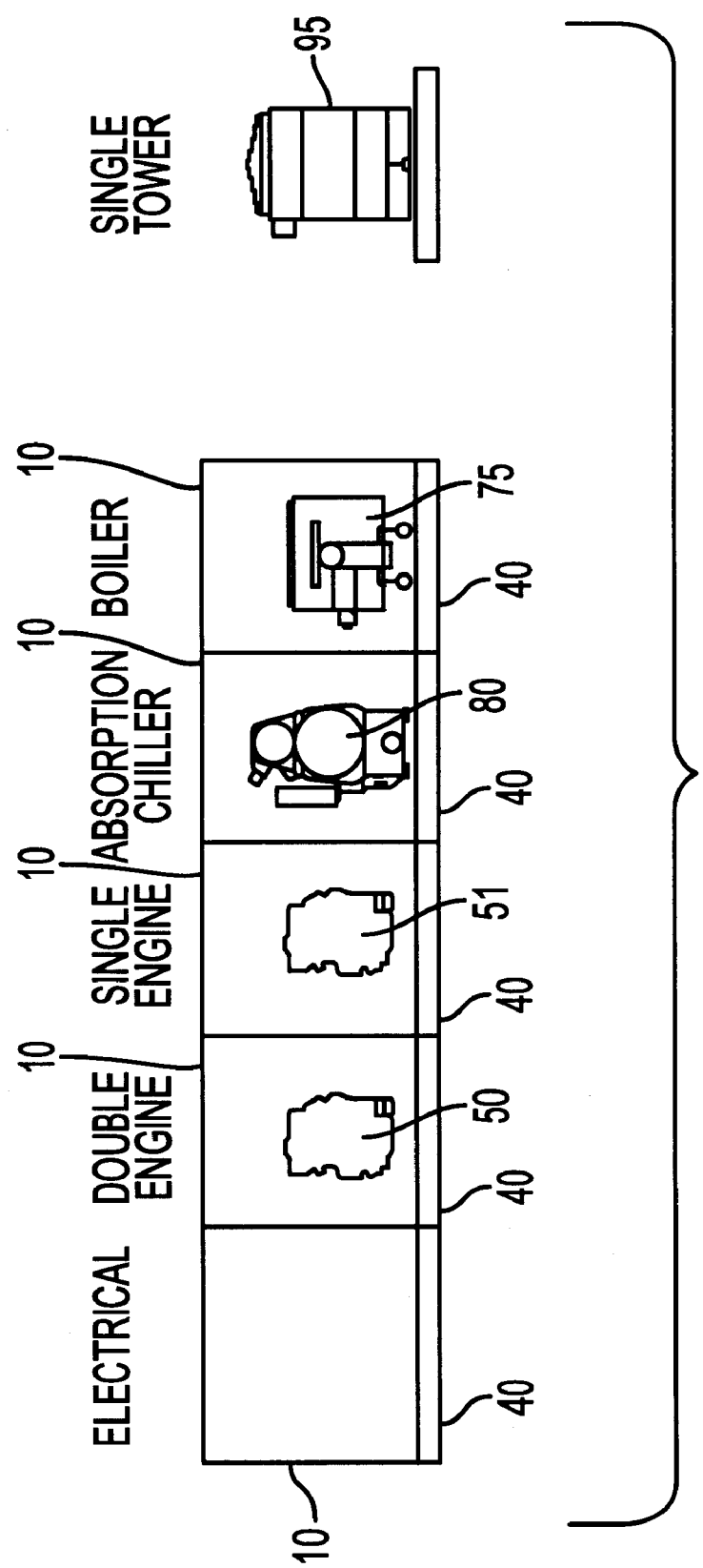
FIG. 12 is a stylized depiction of the front of an exemplary embodiment of a mobile modular intermodal cogeneration system.

FIG. 12 is an exemplary embodiment of a mobile modular intermodal cogeneration system of the present invention. Five modular intermodal transportation units fitted with double engine 50, single engine 45, boiler 75, absorption chiller 80 and a electrical unit 10 are used to produce electrical power, chilled water and hot water. The electrical unit 10 could be used for offices, maintenance, switchgear, control and operations and the like and may even be fitted with built in office furniture. Modular intermodal transportation unit 10 includes a floor and supporting members 40 for the floor. The cooling towers 100 could be replaced by radiators for purposes of the present invention. The foundation of this example mobile modular intermodal cogeneration system would be approximately forty feet deep and forty-four feet wide.

Figure 13:
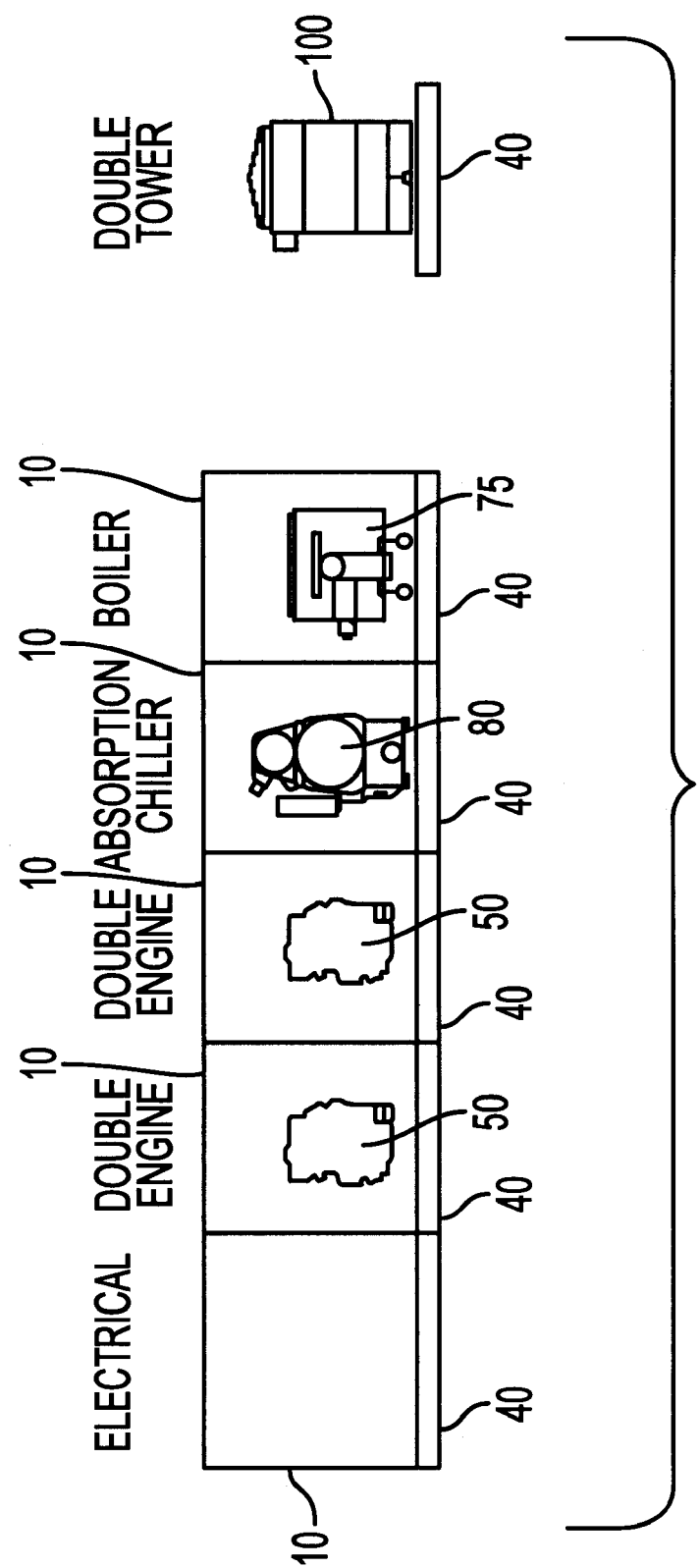
FIG. 13 is a stylized depiction of the front of an exemplary embodiment of a mobile modular intermodal cogeneration system.

FIG. 13 is an exemplary embodiment of a mobile modular intermodal cogeneration system of the present invention. Five modular intermodal transportation units fitted with double engine 50, double engine 50, boiler 75, absorption chiller 80 and a electrical unit 10 are used to produce electrical power, chilled water and hot water. The electrical unit 10 could be used for offices, maintenance, switchgear, control and operations and the like and may even be fitted with built in office furniture. Modular intermodal transportation unit 10 includes a floor and supporting members 40 for the floor. The cooling towers 100 could be replaced by radiators for purposes of the present invention. The foundation of this example mobile modular intermodal cogeneration system would be approximately forty feet deep and forty-four feet wide.

Figure 14:
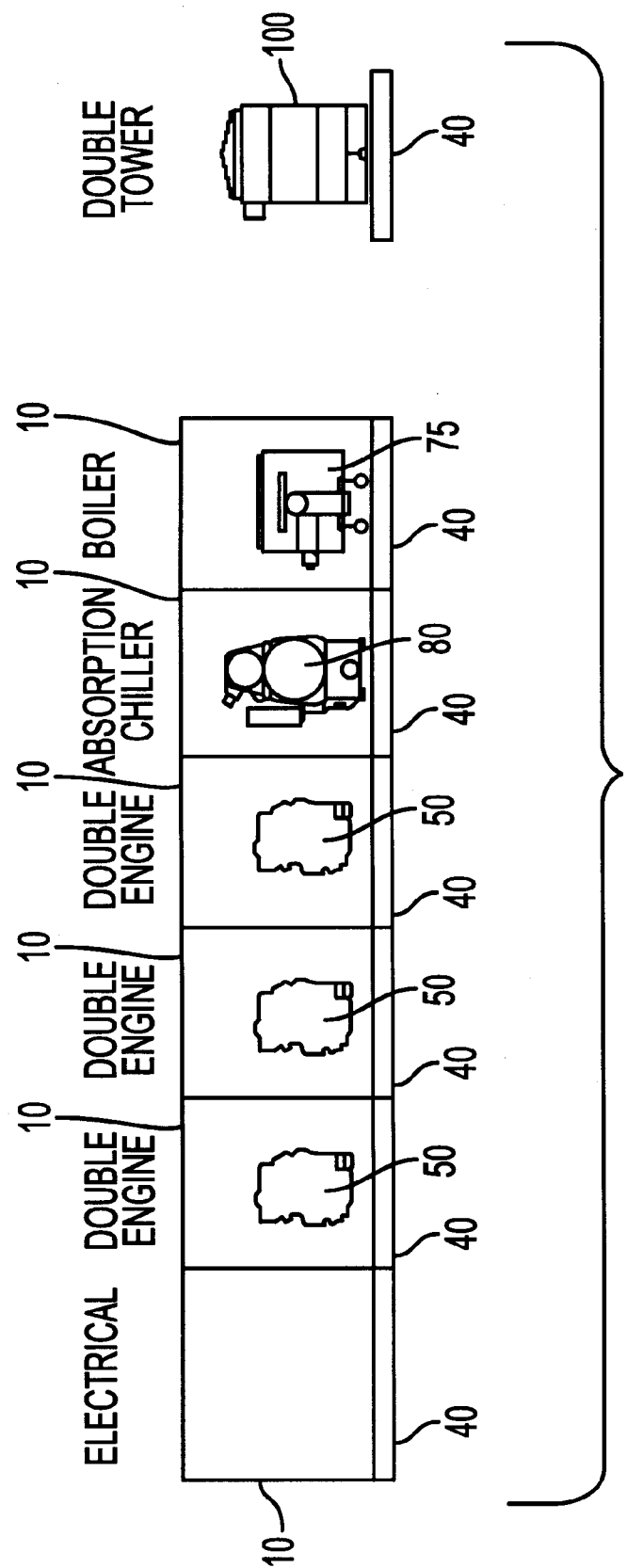
FIG. 14 is a stylized depiction of the front of an exemplary embodiment of a mobile modular intermodal cogeneration system.

FIG. 14 is an exemplary embodiment of a mobile modular intermodal cogeneration system of the present invention. Six modular intermodal transportation units fitted with double engine 50, double engine 50, double engine 50, boiler 75, absorption chiller 80 and a electrical unit 10 are used to produce electrical power, chilled water and hot water. The electrical unit 10 could be used for offices, maintenance, switchgear, control and operations and the like and may even be fitted with built in office furniture. Modular intermodal transportation unit 10 includes a floor and supporting members 40 for the floor. The cooling towers 100 could be replaced by radiators for purposes of the present invention. The foundation of this example mobile modular intermodal cogeneration system would be approximately forty feet deep and fifty-two and a half feet wide.

Figure 15:
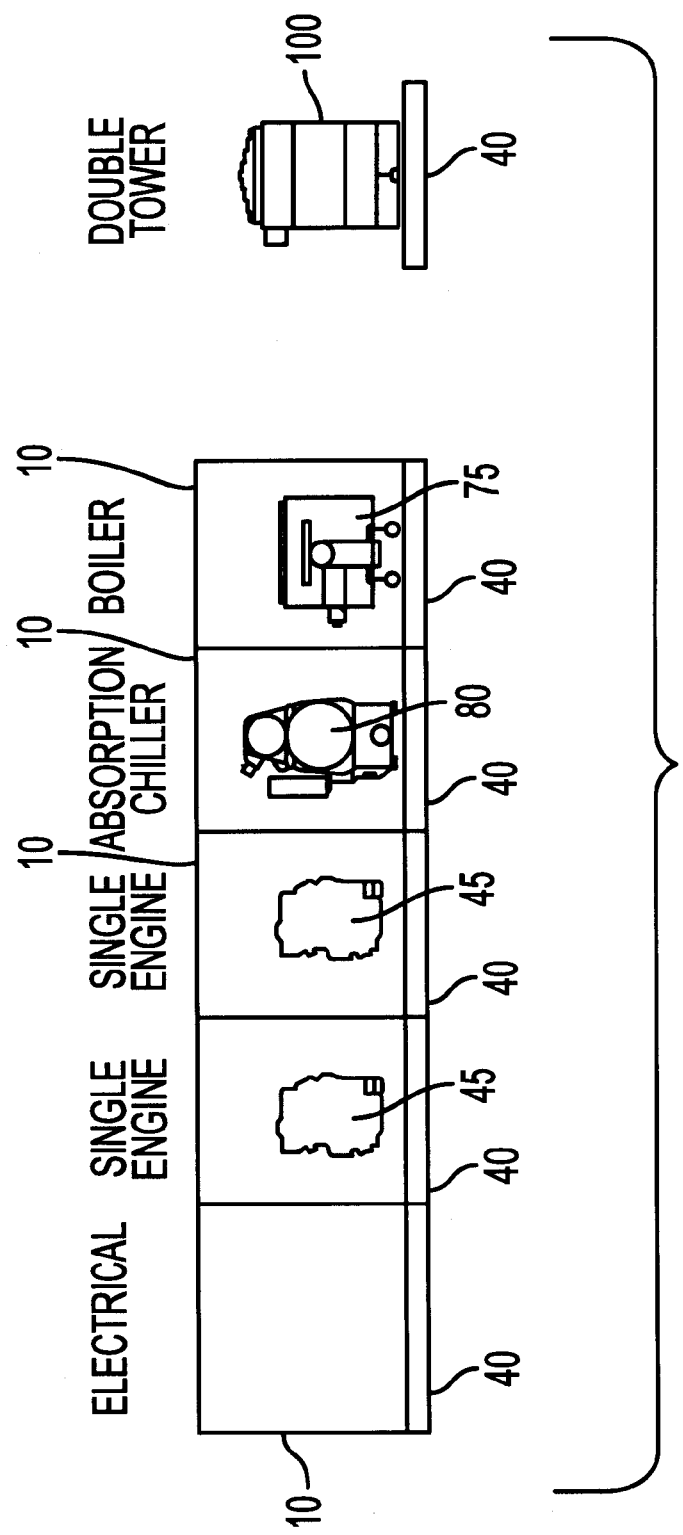
FIG. 15 is a stylized depiction of the front of an exemplary embodiment of a mobile modular intermodal cogeneration system.

FIG. 15 is an exemplary embodiment of a mobile modular intermodal cogeneration system of the present invention. Five modular intermodal transportation units fitted with single engine 45, single engine 45, boiler 75, absorption chiller 80 and a electrical unit 10 are used to produce electrical power, chilled water and hot water. The electrical unit 10 could be used for offices, maintenance, switchgear, control and operations and the like and may even be fitted with built in office furniture. Modular intermodal transportation unit 10 includes a floor and supporting members 40 for the floor. The cooling towers 100 could be replaced by radiators for purposes of the present invention. The foundation of this example mobile modular intermodal cogeneration system would be approximately forty feet deep and forty-four feet wide.

Figure 16:
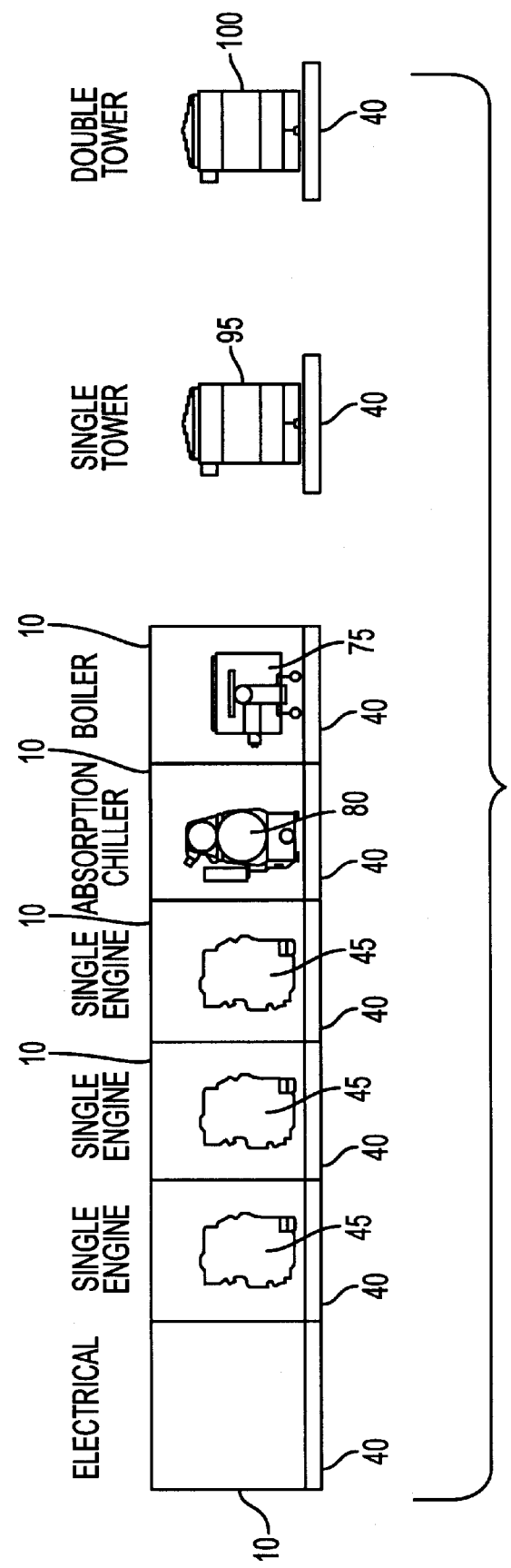
FIG. 16 is a stylized depiction of the front of an exemplary embodiment of a mobile modular intermodal cogeneration system.

FIG. 16 is an exemplary embodiment of a mobile modular intermodal cogeneration system of the present invention. Six modular intermodal transportation units fitted with single engine 45, single engine 45, single engine 45, boiler 75, absorption chiller 80 and a electrical unit 10 are used to produce electrical power, chilled water and hot water. The electrical unit 10 could be used for offices, maintenance, switchgear, control and operations and the like and may even be fitted with built in office furniture. Modular intermodal transportation unit 10 includes a floor and supporting members 40 for the floor. The cooling towers 100 could be replaced by radiators for purposes of the present invention. The foundation of this example mobile modular intermodal cogeneration system would be approximately forty feet deep and fifty-two and a half feet wide.

Figure 17:
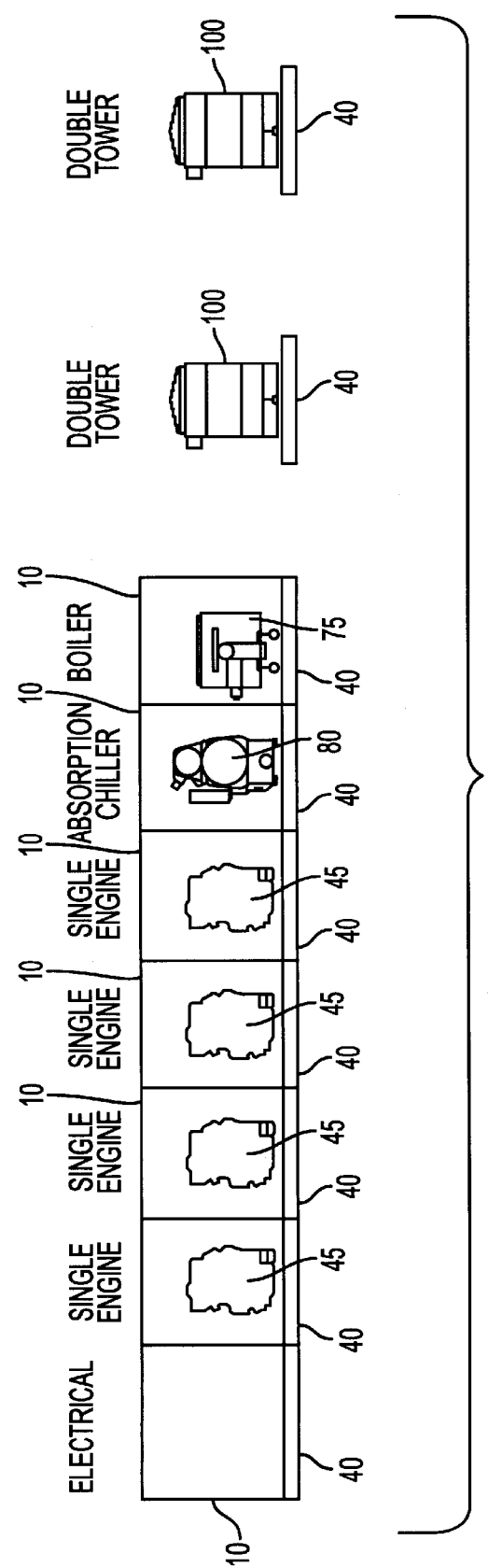
FIG. 17 is a stylized depiction of the front of an exemplary embodiment of a mobile modular intermodal cogeneration system.

FIG. 17 is an exemplary embodiment of a mobile modular intermodal cogeneration system of the present invention. Seven modular intermodal transportation units fitted with single engine 45, single engine 45, single engine 45, single engine 45, boiler 75, absorption chiller 80 and a electrical unit 10 are used to produce electrical power, chilled water and hot water. The electrical unit 10 could be used for offices, maintenance, switchgear, control and operations and the like and may even be fitted with built in office furniture. Modular intermodal transportation unit 10 includes a floor and supporting members 40 for the floor. The cooling towers 100 could be replaced by radiators for purposes of the present invention. The foundation of this example mobile modular intermodal cogeneration system would be approximately forty feet deep and eighty-eight feet wide.

While preferred embodiments of the present invention have been shown and described, it will be appreciated by those skilled in the art that modifications and changes may be made without departing from the spirit of the invention.

What we claim is:

1. A cogeneration system comprising:
   a support grid comprising support beams and support framing mounted to a foundation;
   at least one engine fitted into a modular intermodal transportation unit removably mounted to said support grid;
   at least one electrical modular intermodal transportation unit removably mounted to said support grid;
   at least one boiler fitted into a modular intermodal transportation unit removably mounted to said support grid;
   at least one chiller fitted into a modular intermodal transportation unit removably mounted to said support grid;
   at least one cooling tower or radiator removably mounted to said support grid, and further wherein said cooling tower is physically separated from all of the above modular transportation units to provide ventilation for said cooling unit.

2. The system according to claim 1, wherein said engine further comprises a single engine or a double engine.

3. The system according to claim 2, wherein said chiller further comprises an absorption chiller or a centrifugal chiller.

4. The system according to claim 3, wherein said cooling tower further comprises a single cooling tower or a double cooling tower.

5. The system according to claim 3, wherein said radiator further comprises a single radiator or a double radiator.

6. The system according to claim 1, wherein said modular intermodal transportation units further comprise weather-proof doors or openings for access between said modular intermodal transportation units by operations, maintenance and other necessary personnel.

7. The system according to claim 6, wherein said modular intermodal transportation units further comprise weather-proof openings, ports, inlets, or outlets through which all necessary pipes, fittings, valves, wires, cables, exhaust outlets, intakes and other necessary inputs to and outputs from each modular intermodal transportation unit can pass to effect equipment interface and interconnection.

8. A cogeneration system comprising:
   a support grid mounted to a foundation;
   a plurality of engines each fitted into a modular intermodal transportation unit, each modular intermodal transportation unit containing one of said engines removably mounted to said support grid;
   a plurality of electrical modular intermodal transportation units removably mounted to said support grid;
   a plurality of boilers each fitted into a modular intermodal transportation unit, each of said modular intermodal transportation unit containing one of said boilers removably mounted to said support grid;
   a plurality of chillers each fitted into a modular intermodal transportation unit, each of said modular intermodal transportation unit containing one of said chillers removably mounted to said support grid;
   a plurality of cooling towers or radiators removably mounted to said support grid, and further wherein said cooling towers or radiators are physically separated from all of the above modular transportation units to provide ventilation for said cooling unit or radiator, further wherein each of said cooling towers or radiators may be physically separated from each other to provide ventilation for each other, and further wherein said cooling towers or radiators may be remote from the remainder of said cogeneration system components.

9. The system according to claim 8, wherein each of said modular intermodal transportation units containing one of said engines further comprises a single engine or a double engine.

10. The system according to claim 9, wherein each of said modular intermodal transportation units containing one of said chillers further comprises an absorption chiller or a centrifugal chiller.

11. The system according to claim 10, wherein each of said cooling towers further comprises a single cooling or a double cooling tower.

12. The system according to claim 10, wherein each of said radiators further comprises a single or a double radiator.

13. The system according to claim 8, wherein said modular intermodal transportation units further comprise weather-proof doors or openings for access between said modular intermodal transportation units by operations, maintenance and other necessary personnel.

14. The system according to claim 13, wherein said modular intermodal transportation units further comprise weather-proof openings, ports, inlets, or outlets through which all necessary pipes, fittings, valves, wires, cables, exhaust outlets, intakes and other necessary inputs to and outputs from each modular intermodal transportation unit can pass to effect equipment interface and interconnection.

15. The method of generating electric power in a mobile cogeneration system comprising the steps of:
    driving an engine component fitted into a modular intermodal transportation unit with a natural gas or biogas;
    capturing hot exhaust gasses from said engine to recover thermal energy therefrom, and to reuse said recovered thermal energy;
    driving an exhaust boiler component fitted into a modular intermodal transportation unit with a portion of the output power of said engine to generate hot water; and
    venting by cooling towers.

16. The method of generating electric power in a mobile cogeneration system comprising the steps of:
    driving an engine component fitted into a modular intermodal transportation unit with a natural gas or biogas;
    capturing hot exhaust gasses from said engine to recover thermal energy therefrom, and to reuse said recovered thermal energy; and
    driving a chiller fitted into a modular intermodal transportation unit with a portion of the output power of said engine to generate cooling.

17. The method according to claim 15, further comprising the step of:
    driving a chiller fitted into a modular intermodal transportation unit with a portion of the output power of said engine to generate cooling.

18. A method of operating a mobile modular cogeneration system comprising the steps of:

driving an exhaust boiler component fitted into a modular intermodal transportation unit with a portion of the output power of said engine to generate hot water;

venting by cooling towers; and driving a chiller component fitted into a modular intermodal transportation unit with a portion of the output power of said engine to generate cooling.

19. The method according to claim 18, further comprising the steps of:

detecting a long term increase or decrease in consumer load demand;

removing cogeneration system component that needs to be resized to meet said consumer demand; and replacing said removed cogeneration system component with a larger or smaller capacity cogeneration system component as required.

20. The system according to claim 1, wherein said foundation is concrete.

* * * * *